(12) United States Patent
Khawand et al.

(10) Patent No.: US 10,560,875 B2
(45) Date of Patent: *Feb. 11, 2020

(54) RESPONSIVE QUALITY OF SERVICE MANAGEMENT

(71) Applicant: Microsoft Technology Licensing, LLC, Redmond, WA (US)

(72) Inventors: Jean Khawand, Sammamish, WA (US); Srinivasa L. Rao, Redmond, WA (US); Shivam Kiran Shah, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,514

(22) Filed: Dec. 21, 2018

(65) Prior Publication Data

US 2019/0116525 A1  Apr. 18, 2019

Related U.S. Application Data

(63) Continuation of application No. 15/420,984, filed on Jan. 31, 2017, now Pat. No. 10,200,914.

(60) Provisional application No. 62/448,719, filed on Jan. 20, 2017.

(51) Int. Cl.
| | |
|---|---|
| *H04L 12/28* | (2006.01) |
| *H04W 28/24* | (2009.01) |
| *H04W 28/02* | (2009.01) |
| *H04W 24/08* | (2009.01) |
| *H04W 24/02* | (2009.01) |
| *H04J 1/16* | (2006.01) |

(52) U.S. Cl.
CPC .......... *H04W 28/24* (2013.01); *H04W 24/02* (2013.01); *H04W 24/08* (2013.01); *H04W 28/0268* (2013.01)

(58) Field of Classification Search
CPC . H04W 28/24; H04W 28/0268; H04W 24/02; H04L 47/765; H04L 47/805
USPC ......................... 370/230, 252, 278, 386, 329
See application file for complete search history.

(56) References Cited

U.S. PATENT DOCUMENTS

| | | | |
|---|---|---|---|
| 10,230,645 B1* | 3/2019 | Kalkunte | H04L 45/123 |
| 2011/0314145 A1* | 12/2011 | Raleigh | H04L 41/0893 709/224 |
| 2016/0105821 A1* | 4/2016 | Senarath | H04W 4/00 370/329 |
| 2016/0234124 A1* | 8/2016 | Tomici | H04W 28/24 |
| 2017/0041231 A1* | 2/2017 | Seed | H04W 4/70 |

* cited by examiner

*Primary Examiner* — John Pezzlo
(74) *Attorney, Agent, or Firm* — Holzer Patel Drennan

(57) ABSTRACT

A system manages a quality of service provided to an electronic device during a communication session in a network. A quality of service monitor of the electronic device detects satisfaction of a quality of service adjustment condition for changing the quality of service provided to the electronic device by the network. A quality of service manager of the electronic device requests an adjusted quality of service provided to the electronic device by the network. A communication interface of the electronic device communicates in a communication session at the adjusted quality of service provided to the electronic device by the network.

20 Claims, 9 Drawing Sheets

RESPONSIVE QUALITY OF SERVICE MANAGEMENT

CROSS-REFERENCE TO RELATED APPLICATIONS

The present application claims benefit of priority to U.S. patent application Ser. No. 15/420,984, entitled "RESPONSIVE QUALITY OF SERVICE MANAGEMENT" and filed on Jan. 31, 2017, and U.S. Provisional Patent Application No. 62/448,719, entitled "RESPONSIVE QUALITY OF SERVICE MANAGEMENT" and filed on Jan. 20, 2017, both of which are specifically incorporated by reference for all that they disclose and teach.

BACKGROUND

Quality of service (QoS) represents a characteristic of performance in a communications network (e.g., a telephony network, a storage area network, a computer network). QoS typically takes one or more communication performance factors into account, including without packet loss, jitter, latency, error rates, bit rate, throughput, availability, reliability, etc. A network service provider can allocate resources to increase or decrease the QoS for a particular customer, network, or device. The network service provider typically incurs an increased investment of resources to provide increased levels of QoS to a customer.

Certain applications and/or activities can better accommodate a lower QoS than others. For example, when considering the aspect of QoS relating to guaranteed delay, applications executing Web surfing and bulk file transfer activities generally do not require a high QoS, whereas high definition video streaming, mission critical delay-sensitive signaling, and mission critical database access may depend on a high QoS. However, QoS is typically managed by the communications network and/or network service provider in a somewhat static manner in accordance with a service level agreement. Furthermore, a particular QoS level is broadly allocated to the computing system(s) covered by the service level agreement (e.g., all of the computers in a facility or enterprise), with a higher QoS costing more than a lower QoS.

SUMMARY

The described technology provides dynamic QoS management that is responsive to QoS adjustment requests by individual devices within a network. A system for managing a quality of service provided to an electronic device during a communication session in a network includes a quality of service monitor of the electronic device configured to detect satisfaction of a QoS adjustment condition for changing the quality of service provided to the electronic device by the network. A quality of service manager of the electronic device is configured to request an adjusted quality of service provided to the electronic device by the network. Such a request may be issued on an on-demand basis as per the QoS adjustment condition (e.g., detected communication needs) detected by the electronic device. A communication interface of the electronic device is configured to communicate in a communication session at the adjusted quality of service provided to the electronic device by the network, responsive to the request of the electronic device.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The described technology provides a capability for a communication device to monitor, detect, and remedy quality of service (QoS) problems during a communications session. QoS represents a characteristic or set of characteristics of performance in a communications network, and QoS can be allocated among different communications channels within a communication network to provide a higher QoS for certain communications and a lower QoS for other communications. For example, real time online gaming typically performs sufficiently from a guaranteed bandwidth with a low packet delay and a moderate packet loss to provide a smooth game play experience, whereas buffered streaming video typically performs sufficiently from a non-guaranteed bandwidth with a higher packet delay and a very low packet loss. Network data providers allocate QoS according to available networking resources, QoS demands by various devices communicating over a network, service level agreements and other factors. By allowing an individual communication device to "negotiate" adjustments in QoS available to it, responsively/dynamically managing/requesting quality of service of a communication session allows efficient networking resource allocation, efficient allocation of desired QoS to individual devices on the network, and/or dynamic management of data costs within a service level agreement.

Figure 1:
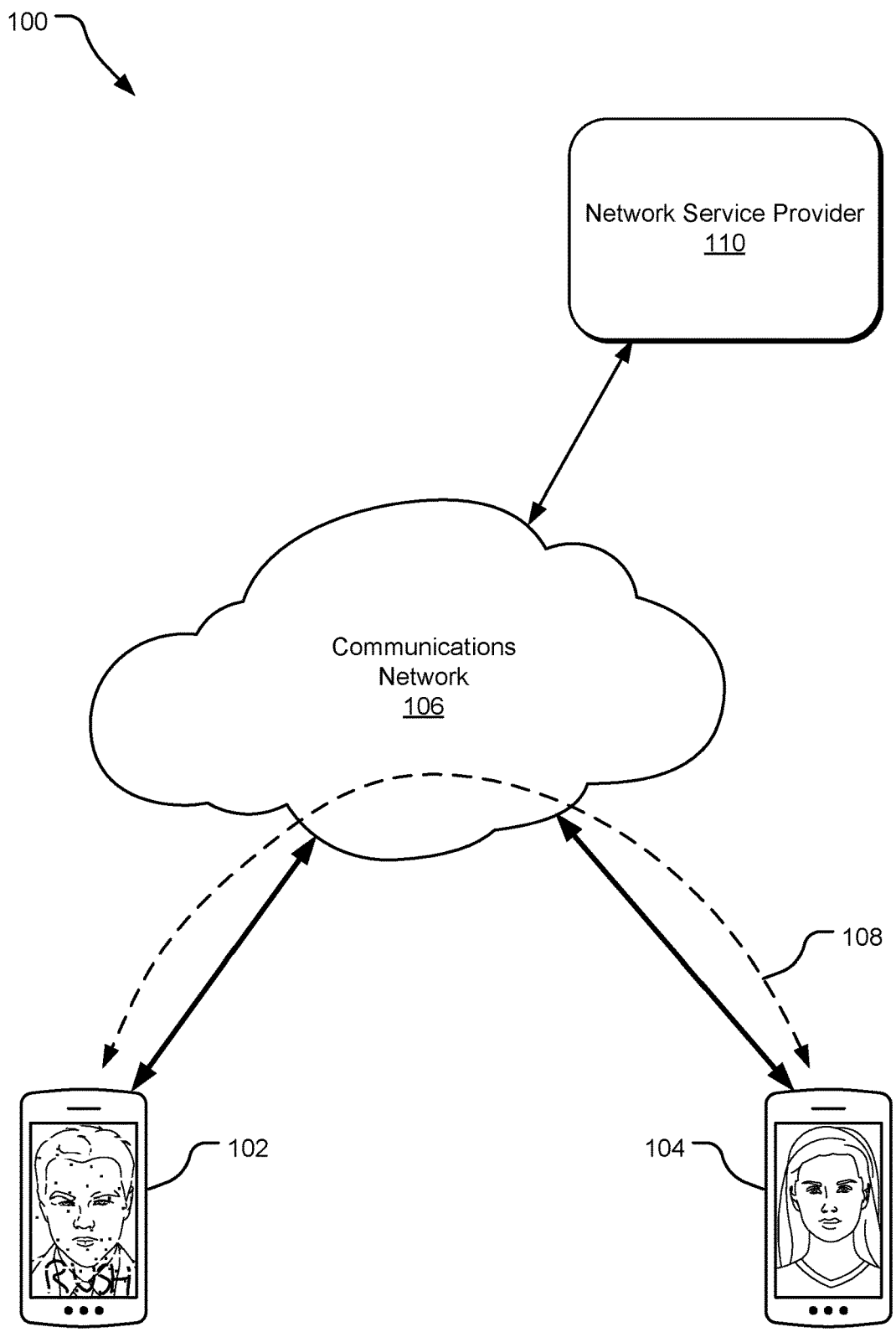
FIG. 1 illustrates an example electronic device detecting inadequate communication quality.

FIG. 1 illustrates an example electronic device 102 detecting inadequate communication quality. The scenario 100 illustrates an example videoconference taking place between a user of the electronic device 102 and the electronic device 104, which are communicatively coupled (via wire and/or wirelessly) to a communications network 106. The communications between the two electronic devices 102 and 104 travel through the communications network 106, as shown by dashed communication messages 108. The communication network 106, and particularly the network performance available to the electronic device 102 within the communication network 106 is in large part managed by a network service provider 110, among other factors, such as network load, environmental conditions, network resource allocation, service level agreements, etc. The example electronic devices 102 and 104 are shown as mobile smartphones, but any communication device may be employed, including without limitation workstations, tablet computers, set-top boxes, televisions, wearable devices, and other communication devices employable in the "Internet of Things" (IoT) paradigm.

It should be understood that the electronic devices 102 and 104 may be clients on different network service providers. Nevertheless, each electronic device 102 or 104 can detect network performance conditions on its network or on the device itself and request an adjusted QoS from its corresponding network service provider.

The video of the person presented on the electronic device 102 shows evidence of pixelation and other possible communication-induced distortion. One might also expect that videoconference audio may also be distorted. The QoS monitor (not shown in FIG. 1) in the electronic device 102 monitors network communication performance statistics, including bit rate, jitter, packet loss, packet delay, etc. The QoS monitor may be implemented as a combination of one or more hardware processors of the electronic device 102 and operating system software, firmware, utility software, driver software, helper application software, etc.

For example, a QoS monitor in the operating system (OS) can perform processor-implemented operations for monitoring network communication performance, such as by communicating with networking drivers and chipsets. The QoS monitor may also receive feedback from the user indicating a poor quality communication session (e.g., through a user interface control allowing the user to notify an application or the OS of communication problems). Such monitored performance information can be used by the electronic device 102 to request the network service provider 110 to adjust the QoS allocated by the communications network 106 to the electronic device 102.

In some cases, the QoS adjustment may be to "increase" the general QoS allocated to the electronic device 102, for example, to provide better video and audio playback during a videoconference. In other cases, the QoS adjustment may be to "decrease" the general QoS allocated to the electronic device 102, for example, because the videoconference has ended or the link characteristic has changed (e.g., due to a handover to another channel or base station) to improve network conditions, and there is no longer benefit to paying an additional cost for a higher level of QoS.

Figure 2:
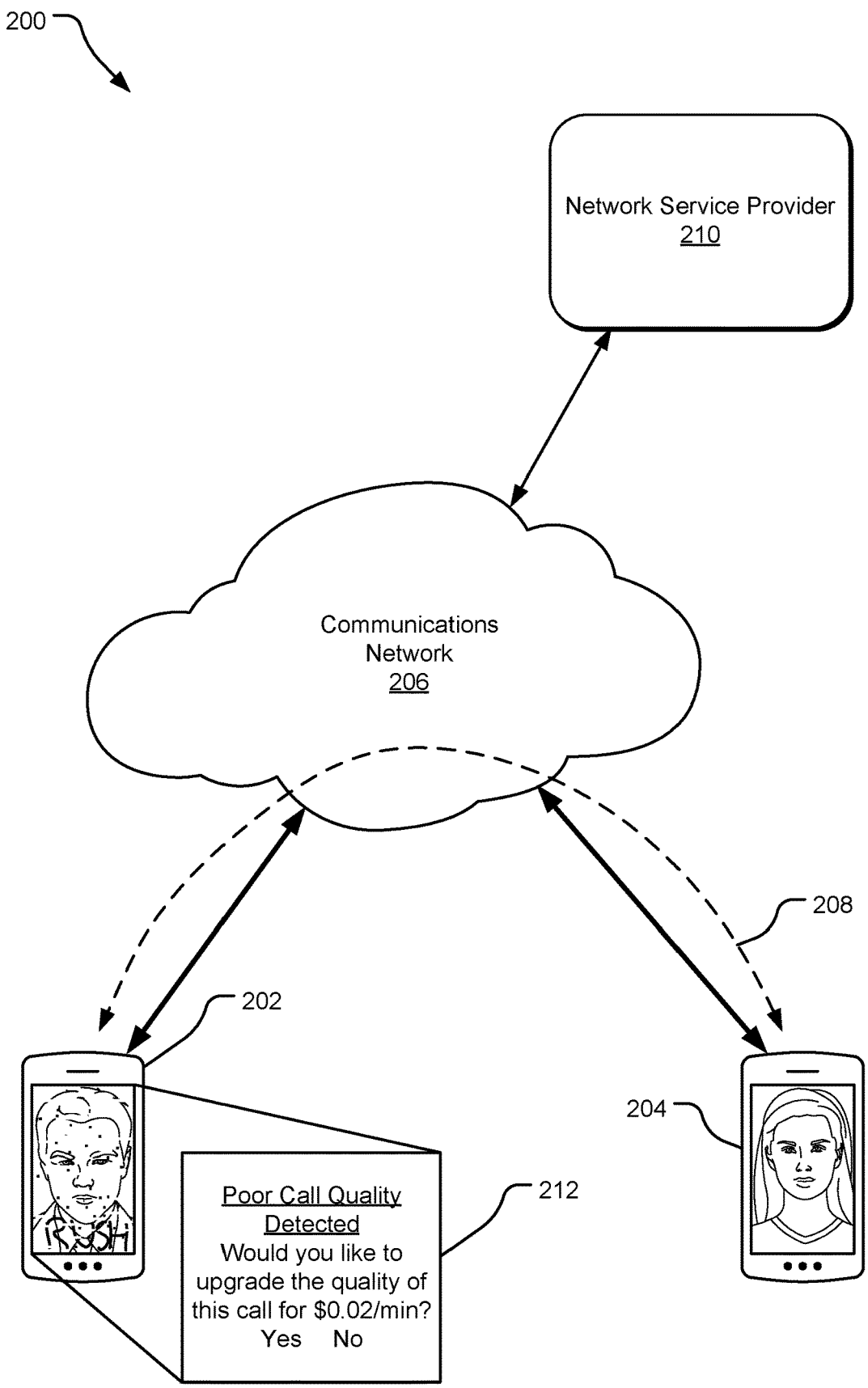
FIG. 2 illustrates an example electronic device prompting a user about upgrading network performance for a communication session to resolve inadequate communication quality.

FIG. 2 illustrates an example electronic device 202 prompting a user about upgrading network performance for a communication session to resolve inadequate communication quality. The scenario 200 illustrates an example videoconference taking place between a user of the electronic device 202 and the electronic device 204, which are communicatively coupled (via wire and/or wirelessly) to a communications network 206. The communications between the two electronic devices 202 and 204 travel through the communications network 206, as shown by dashed communication messages 208. The communication network 206, and particularly the network performance available to the electronic device 202 within the communication network 206 is in large part managed by a network service provider 210, among other factors, such as network load, environmental conditions, network resource allocation, service level agreements, etc. The example electronic devices 202 and 204 are shown as mobile smartphones, but any communication device may be employed, including without limitation workstations, tablet computers, set-top boxes, televisions, wearable devices, and other communication devices employable in the "Internet of Things" (IoT) paradigm.

The video of the person presented on the electronic device 202 shows evidence of pixelation and other possible communication-induced distortion. One might also expect that videoconference audio may also be distorted. The QoS monitor (not shown in FIG. 2) in the electronic device 202 monitors network communication performance statistics, including bit rate, jitter, packet loss, packet delay, etc. The QoS monitor may be implemented as a combination of one or more hardware processors of the electronic device 202 and operating system software, firmware, utility software, driver software, helper application software, etc. Based on the monitored network performance statistics, the QoS monitor detects that the network performance is inadequate for the electronic device 202 and the videoconferencing application executing on the electronic device 202.

In some implementations, responsive to the detection of the network performance problem, a QoS manager (not shown in FIG. 2) prompts the user regarding a possible upgrade to the QoS for the duration of the videoconferencing call session. As shown by the prompt 212, which is presented through the user interface of the electronic device 202, the QoS monitor has detected poor call quality and the QoS manager has inquired whether the user would like to upgrade QoS (at a specified price) for the duration of the call. The prompt 212 may be presented by the QoS manager, a component of the OS, by the videoconferencing application, etc. For example, the QoS manager may notify the videoconferencing application through an application programming interface (API) of an opportunity to upgrade QoS. The user's response can be communicated back to the QoS manager via the same API or some other means. As shown in FIG. 2, an additional charge for an upgraded QoS is also communicated to the user via the prompt 212. If accepted, the additional charge can be implemented through the user's account with the network service provider or via other payment means.

In at least one implementation, the QoS monitor can also detect whether network performance can be adequately improved by upgraded QoS. For example, if signal quality is very low, then upgraded QoS may not provide the electronic device with a sufficient improvement in network performance to warrant the QoS adjustment request. The problem in this scenario is the signal quality, and upgraded QoS may not sufficiently improve the network performance for the communication session.

It should be understood that QoS adjustment requests can be issued from the electronic device 202 automatically, without user intervention or prompting, particularly when such action is configured in a preferences or policies data store of the electronic device 202. For example, a user may configure a setting authorizing the device to automatically request an upgraded QoS for the duration of a videoconference call if insufficient network performance is detected. Alternatively, a customer or set of customers (e.g., identified by unique credentials) may have already paid or agreed to pay for automatic upgrades in QoS when satisfaction of a QoS adjustment condition is detected.

As previously discussed, QoS adjustments can be either increased or decreased. As such, in alternative implementations, the prompt 212 may offer the user a discount for agreeing to temporarily decrease the QoS (e.g., for example, to allow the network service provider to temporarily increase QoS for other users). In this scenario, the QoS monitor may determine that no network communication is currently needed or that a lower level of QoS is sufficient for its currently operating applications. As such, the user may manually agree (or the electronic device 202 may automatically send an agreement) to such a temporary decrease in QoS.

Figure 3:
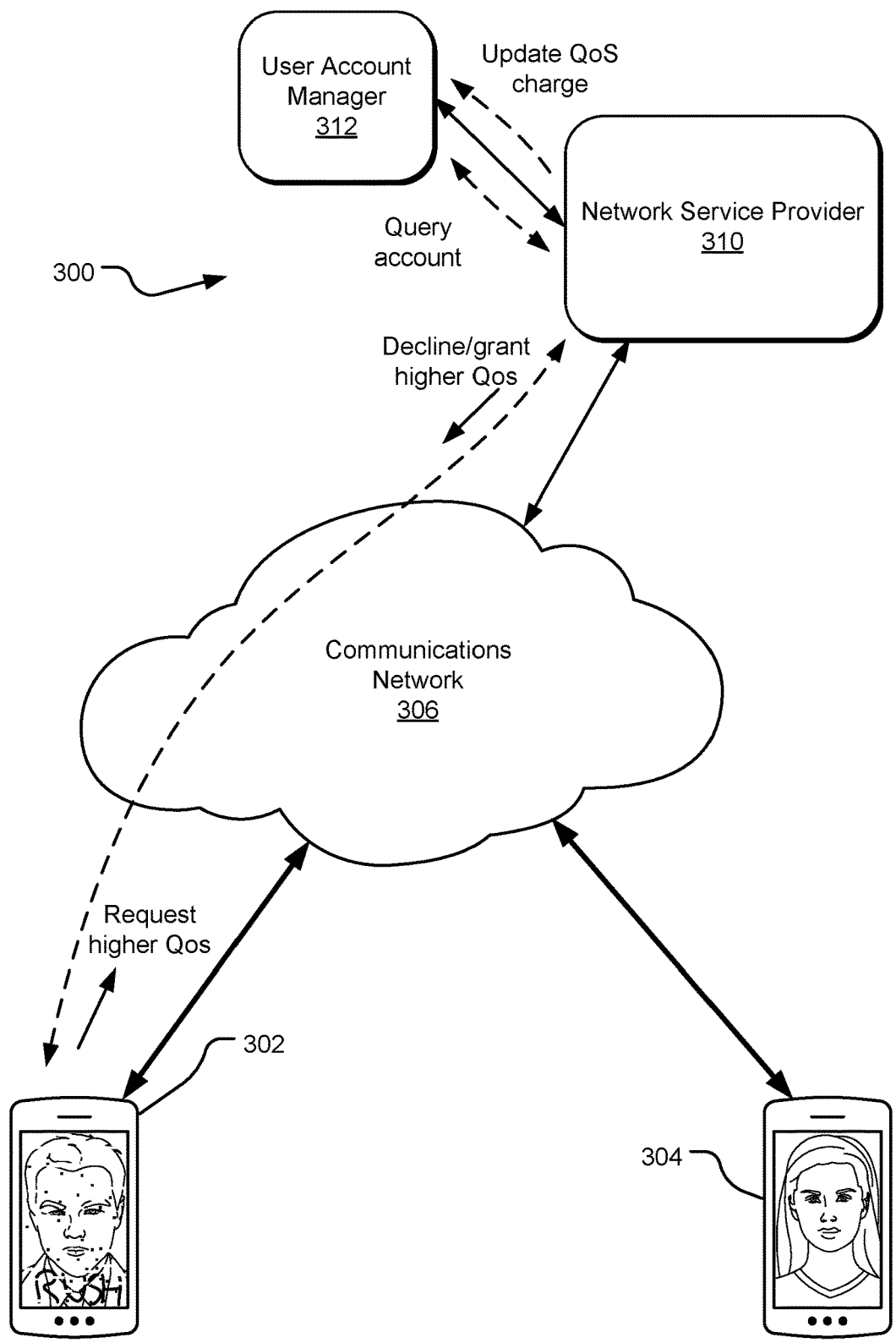
FIG. 3 illustrates an example electronic device requesting and receiving an increased quality of service from a network service provider for a communication session.

FIG. 3 illustrates an example electronic device 302 requesting and receiving an increased quality of service from a network service provider 310 for a communication session with an electronic device 304. The QoS monitor (not shown) in the electronic device 302 detects a network performance problem on a communications network 306 and requests a higher QoS from the network service provider 310. The request may initially request the cost of a QoS upgrade in a first interaction and then submit the request for the QoS upgrade responsive to determination that the user has authorized the upgrade (whether by user interaction, preferences, etc.).

In the network service provider's back office 300, the network service provider 310 evaluates the user's account settings through a user account manager 312 (which may have access to various user account data stores) to determine whether a QoS upgrade request can be granted for the user, the application, and/or the electronic device 302, what the upcharge will be for such a QoS upgrade, etc. The network service provider's response can include the upcharge for the upgrade and/or simply a grant or denial of the QoS upgrade. If the QoS upgrade is granted, then the upcharge is recorded in the user's account. In another implementation, the user's accounting settings may be stored in a SIM in the electronic device 302, and evaluated by the electronic device 302 and/or the network service provider 310 to determine whether the QoS upgrade request may be granted.

Figure 4:
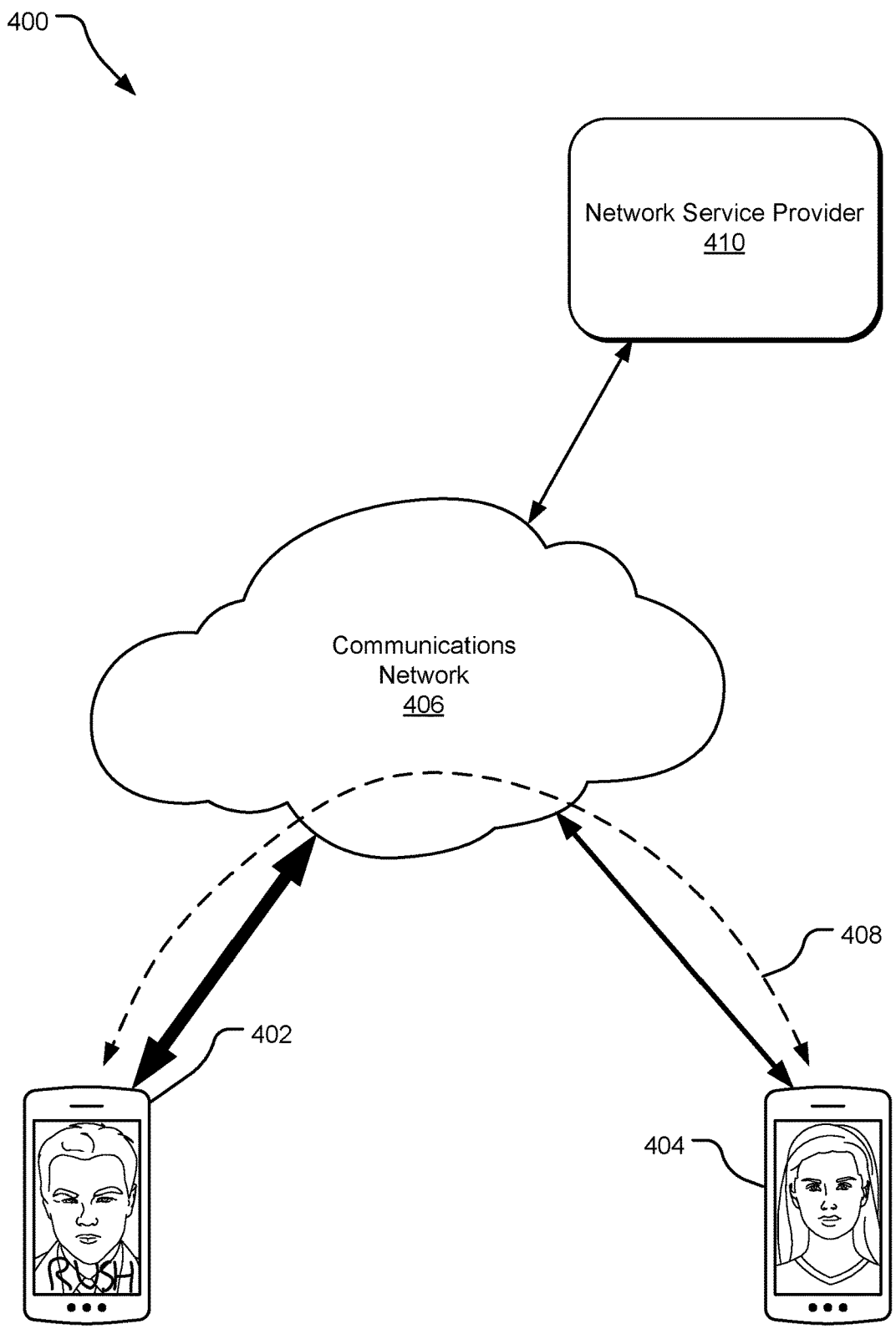
FIG. 4 illustrates an example electronic device receiving adequate communication quality through an upgraded quality of service.

FIG. 4 illustrates an example electronic device 402 receiving adequate communication quality through an upgraded quality of service. The scenario 400 illustrates an example videoconference taking place between a user of the electronic device 402 and the electronic device 404, which are communicatively coupled (via wire and/or wirelessly) to a communications network 406. The communications between the two electronic devices 402 and 404 travel through the communications network 406, as shown by dashed communication messages 408. The communication network 406, and particularly the network performance available to the electronic device 402 within the communication network 406 is in large part managed by a network service provider 410, among other factors, such as network load, environmental conditions, network resource allocation, service level agreements, etc. The example electronic devices 402 and 404 are shown as mobile smartphones, but any communication device may be employed, including without limitation workstations, tablet computers, set-top boxes, televisions, wearable devices, and other communication devices employable in the "Internet of Things" (IoT) paradigm.

As suggested by the thicker double arrowed line between the electronic device 402 and the communications network 406, the user has successfully obtained an upgrade to a higher QoS for the communication session. Accordingly, the video of the person presented on the electronic device 402 shows reduced or eliminated pixelation and/or other communication-based distortion. One might also expect that videoconference audio may also be improved with the upgraded QoS. The QoS monitor (not shown in FIG. 4) in the electronic device 402 monitors network communication performance statistics, including bit rate, jitter, packet loss, packet delay, etc. The QoS monitor may be implemented as a combination of one or more hardware processors of the electronic device 402 and operating system software, firmware, utility software, driver software, helper application software, etc. Based on the monitored network performance statistics, the QoS monitor detects that the network performance is now adequate for the electronic device 402 and the videoconferencing application executing on the electronic device 402.

Figure 5:
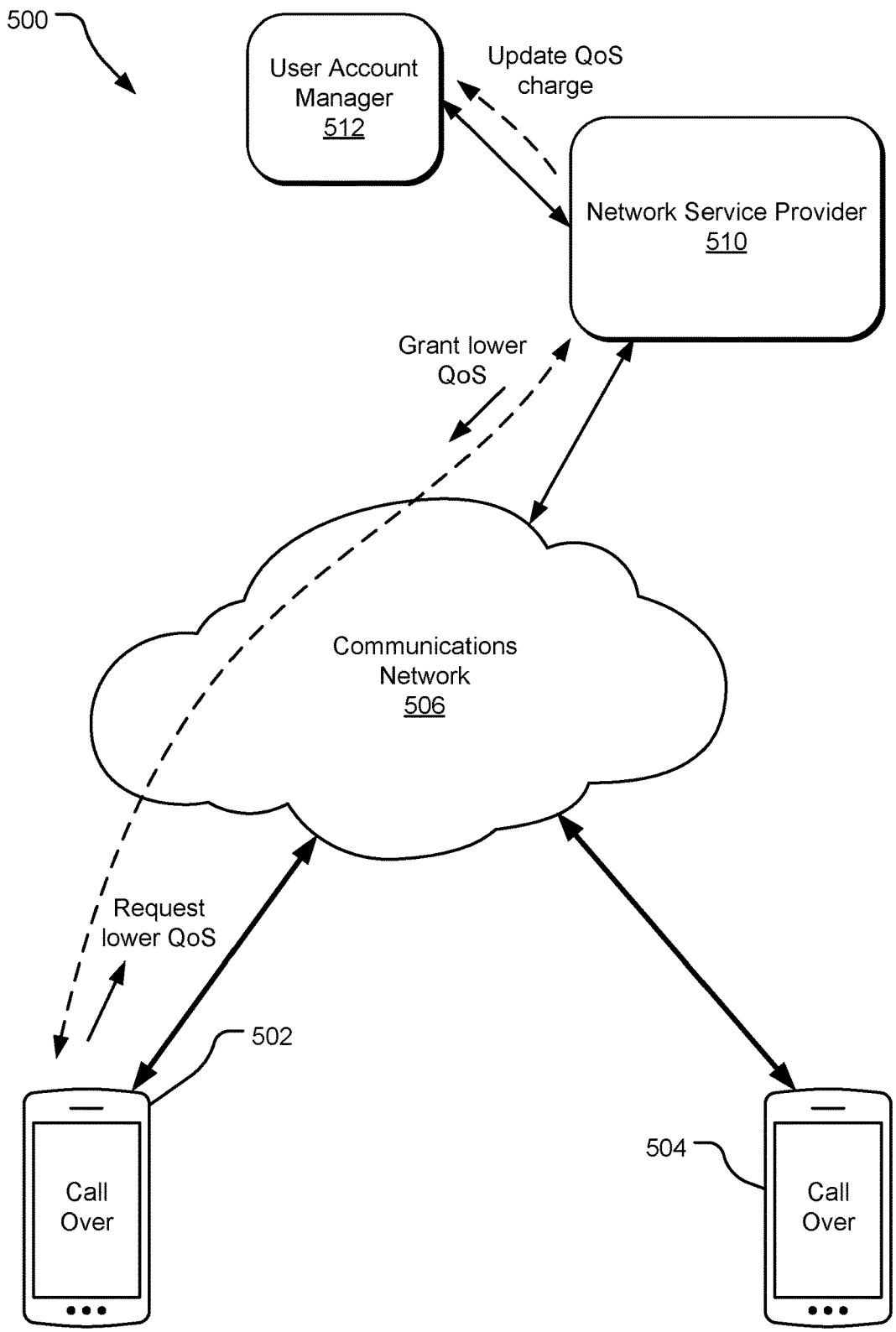
FIG. 5 illustrates an example electronic device requesting and receiving a decreased quality of service from a network service provider after a communication session.

FIG. 5 illustrates an example electronic device 502 requesting and receiving a decreased quality of service from a network service provider 510 after a communication session. The scenario 500 illustrates an example videoconference taking place between a user of the electronic device 502 and the electronic device 504, which are communicatively coupled (via wire and/or wirelessly) to a communications network 506. The communications between the two electronic devices 502 and 504 travel through the communications network 506, but in FIG. 5, the videoconference call has been terminated.

The communication network 506, and particularly the network performance available to the electronic device 502 within the communication network 506 is in large part managed by a network service provider 510, among other factors, such as network load, environmental conditions, network resource allocation, service level agreements, etc. The example electronic devices 502 and 504 are shown as mobile smartphones, but any communication device may be employed, including without limitation workstations, tablet computers, set-top boxes, televisions, wearable devices, and other communication devices employable in the "Internet of Things" (IoT) paradigm.

Because the communication session (e.g., the videoconferencing call) has terminated, the electronic device 502 no longer needs the upgraded performance and can then request a return to a lower QoS. The request is transmitted to the network service provider 510, which grants the request to a lower QoS and updates via the user account manager 512 the QoS charge in the user's account to reflect the reduction in QoS from the temporarily upgraded QoS.

The scenario illustrated in FIG. 5 assumes that no other communication session having QoS adjustment capabilities continues after termination of the first communication session. However, the electronic device 502 may have multiple communications sessions executing concurrently. In such circumstances, the QoS adjustment conditions for each communication session may be individually evaluated (e.g., continuously or periodically) to determine whether the current network conditions are providing sufficient network performance to satisfy the predefined network performance condition of each communication session. If not, the electronic device 502 may request an upgraded QoS to satisfy the predefined network performance conditions of one or more of the communication sessions. Likewise, if the current network conditions are providing sufficient network performance to satisfy the predefined network performance condition of each communication session, the electronic device 502 may simply take no action in requesting a QoS adjustment. Alternatively, if the current network conditions are providing sufficient network performance by a large margin, the electronic device 502 request a downgrade of the guaranteed QoS provided to the electronic device 502 by the network.

Figure 6:
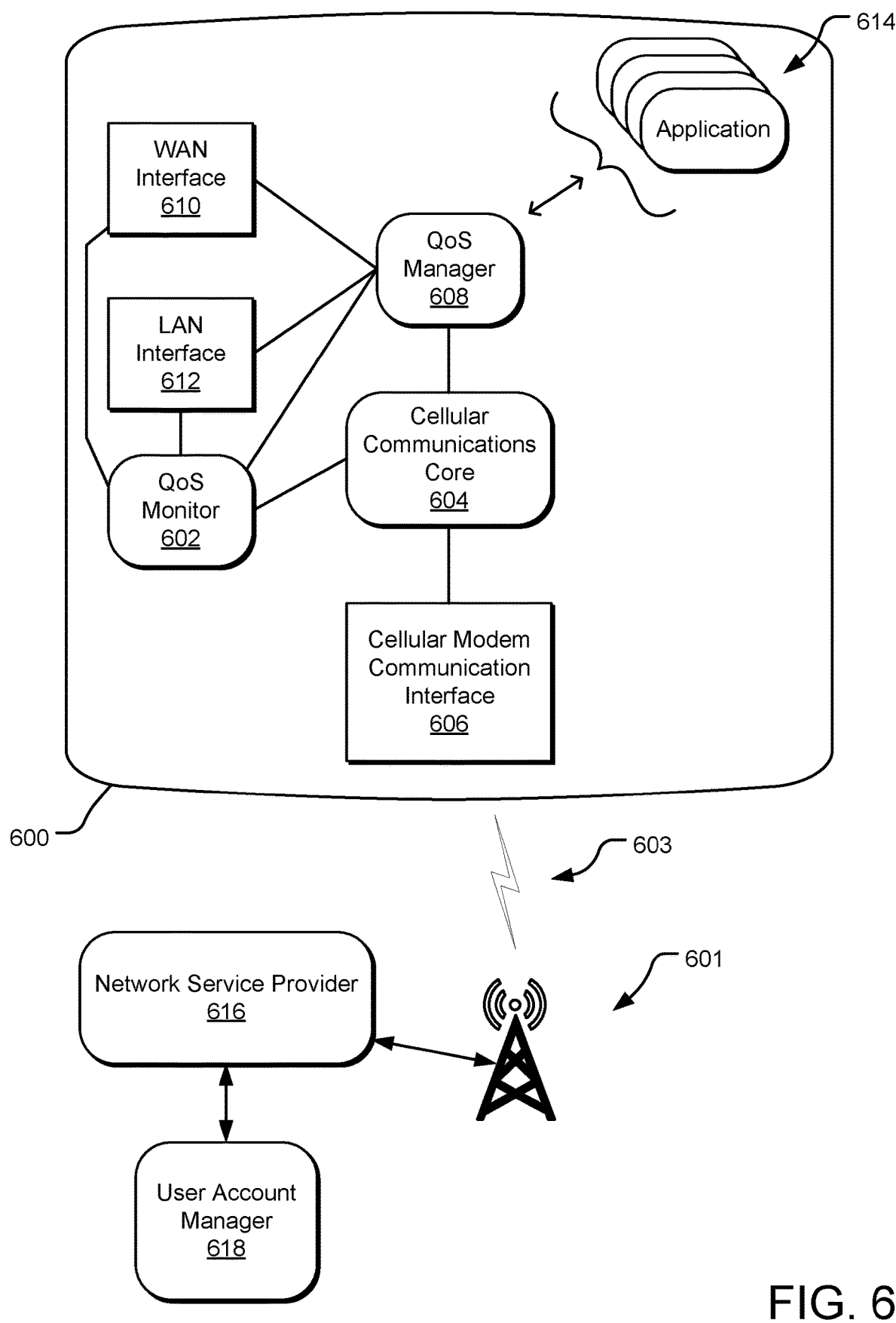
FIG. 6 illustrates an example electronic device for responsively/dynamically managing quality of service of a communication session.

FIG. 6 illustrates an example electronic device 600 for responsively/dynamically managing quality of service of a communication session. FIG. 6 is used to describe an implementation relating to QoS in cellular communications, but the described technology may be applied to any type of network in which negotiation of QoS with a network service provider 616 is available, including without limitation cellular, cellular mobile virtual network operators (MVNOs), cable, Wi-Fi, etc. In the cellular scenario described with regard to FIG. 6, QoS is impacted by mobility, dynamic signal strength conditions based on traffic, limited radio capabilities, core network resources, and service allocation by the network service provider 616.

The electronic device 600 is registered with a network (e.g., LTE) to communicate (see a wireless link 603) via various network nodes and access points (see an example antenna 601). Upon registration, the electronic device 600 is assigned a default bearer (e.g., non-guaranteed bit rate and best effort delay class), which is generally applied to data transmissions of all types (e.g., VOIP, gaming, video streaming). A "bearer" represents a virtual connection, such as between a UE (user equipment) and a PDN-GW (Packet Data Network GateWay) within the network, that provides data transport service with specific QoS attributes. In this default bearer mode, the network makes its best effort to schedule and allocate resources from the shared pool of available network resources and does not generally differentiate among different types of traffic (e.g., whether real time or web based browsing) when granting such network resources. This default QoS corresponds to Non-BGR bearers (non-Guaranteed Bit Rate, Best Effort Delay Class).

With the described technology, software of the electronic device 600, such as an operating system component and/or an application, can detect a poor-quality transmission and proactively initiate a re-negotiation of the QoS using standard 3GPP 24.201 (LTE) 3GPP 24.008 (2G/3G) Non-Access Stratum (NAS) layer messages, such as QoS Change Requests (e.g., "Bearer Resource Allocation Request(LTE)," "Bearer Resource Modification Requests (LTE)," "Modify PDP Context Request(3G)"). Such messages include information for Bearer Modification with a QoS Class Identifier (QCI) and Priority parameters, such as Minimum Delay Class and Expected Aggregate Bandwidth that are compatible with the type of traffic in progress.

The following table provides the details of a subset of QoS Class Identifiers (QCIs) and standard characteristics as defined in the 3GPP TS 23.203 standard "Policy and Charging Control Architecture." Other QCI classes are also defined by 3GPP. Furthermore, other QoS parameters and/or associated network performance parameters may be applicable to other communication channels, whether in cellular technology, LAN/WAN technology, Bluetooth technology, or other technologies.

| QCI | Bearer Type | Priority | Packet Delay | Packet Loss | Example Traffic |
|---|---|---|---|---|---|
| 1 | GBR | 2 | 100 ms | $10^{-2}$ | VoIP Call, Skype |
| 2 | | 4 | 150 ms | $10^{-3}$ | Video Call |
| 3 | | 3 | 50 ms | $10^{-3}$ | Real Time Online Gaming |
| 4 | | 5 | 300 ms | $10^{-6}$ | Video Streaming (Non-Conversational) |
| 5 | Non-GBR | 1 | 100 ms | $10^{-6}$ | Signaling (IMS) |
| 6 | | 6 | 300 ms | $10^{-6}$ | Video, TCP-Based services, such as email, chat, ftp, etc. |
| 7 | | 7 | 100 ms | $10^{-3}$ | Voice, Video, (Live Streaming), Interacting Gaming |
| 8 | | 8 | 300 ms | $10^{-6}$ | Video (Buffered Streaming), TCP Based services, such as email, chat, ftp, etc. |
| 9 | | 9 | 300 ms | $10^{-6}$ | Video (Buffered Streaming) TCP-Based (for example, www, email, chat, ftp, p2p and the like). Typically used as default bearer |
| 69 | | 0.5 | 60 ms | $10^{-6}$ | Mission Critical Delay sensitive signaling (e.g., MC-PTT signaling) |
| 70 | | 5.5 | 200 ms | $10^{-6}$ | Mission Critical Data (e.g., example services are the same as QCI 6/8/9) |

Upon receiving the above-referenced NAS-level messages requesting an adjusted QoS, the network service provider 616 can determine whether the electronic device 600 is authorized to receive the requested adjusted QoS, such as by checking a user account via a user account manager 618. (In certain cellular networks, for example, checking for user privileges for higher QoS could also be implemented as part of the Core Network Policy and Charging Control Network elements.) If the user is so authorized, the network service provider 616 can grant the new dedicated end-to-end bearers (virtual connections), which results in triggering NAS-level signaling to complete the assignment of bearers across the network and on the wireless link 603 granting the adjusted QoS to the electronic device (e.g., the user equipment). The granted QoS is communicated back to the electronic device 600 in response to the QoS Change Request.

In many situations, the electronic device 600 detects a need of benefit for an increased QoS for a particular application and/or type of traffic it is handling. As such, the increased QoS may include a guaranteed bit rate and guaranteed delay class, although intermediate QoS increases may alternatively be granted. In a different situation, the electronic device 600 detects that it no longer needs or benefits from an increased QoS for a particular application and/or type of traffic it is handling. As such, the electronic device 600 can request a decreased QoS that may no longer include a guaranteed bit rate and guaranteed delay class, although intermediate QoS increases may alternatively be granted.

Increasing QoS typically increases the cost to the user of the electronic device 600, whereas decreasing QoS typically decreases the cost to the user. Likewise, increasing QoS typically increases the pressure on network resources allocated by the network service provider 616, whereas decreasing QoS typically decreases the pressure on network resources allocated by the network service provider 616.

Turning in more detail to the example implementation illustrated in FIG. 6, a QoS monitor 602 monitors network performance through the cellular communications core 604 and the cellular modem communication interface 606. A QoS manager 608 manages the communications and decisions regarding the current and/or desired QoS for a communication session and may also manage QoS-related user interface prompts and replies through the electronic device. The QoS manager 608 also monitors applications 614, particularly application communication requirements and the network performance the application is experiencing during a communication session. For example, the QoS manager 608 can receive traffic types and experienced QoS feedback from the applications 614.

The QoS Feedback refers to the network performance experience by each application 614, e.g., in terms of parameters including but not limited to loss rate, burst duration, gap duration, mean opinion score (MOS), or even end user giving direct feedback as the customer uses the application, etc. Monitoring of experience QoS Feedback can be accomplished, for example, by the QoS monitor 602 providing APIs to each application 614 to actively feed in such parameters, either regularly or as a triggered event, when any of the above parameters being monitored exceeds a tolerance threshold that may be predefined for that specific application for an acceptable end user experience from that application.

The QoS feedback parameters for an application 614 may depend on the type of application as is described below. A file transfer protocol (FTP) application in the background, for example, may prioritize about download speeds over jitter, whereas an application such as VoIP prioritizes delay and jitter over networks speeds. Some example traffic types are included in a sample Traffic Type enum below and by other code structures and interface specifications, which can be used to define tolerance per parameter based on traffic type as well as experienced QoS feedback.

It should be understood that the QoS monitor 602 and the QoS manager 608 can also monitor and manage QoS and communications through other interfaces, including without limitation a wide area network (WAN) interface 610 and a local area network (LAN) interface 612.

The QoS monitor 602 and the QoS manager 608 (collectively referred to as a QoSAggregatorandDecisionModule of the operating system in some implementations) implement QoS decision-making operations to determine when a change in QoS might be desirable or beneficial and communicate with the network to adjust the QoS provided by the network to the electronic device 600. In some implementations, the decision, for example, can be based on various application properties, including without limitation example factors such as traffic type and experienced QoS feedback.

The QoS manager 608 aggregates the information it monitors from the applications 614 and the network performance information it receives from the QoS monitor 602. The QoS monitor 602 receives such network performance information on the quality of the channel from the network interface (e.g., the cellular modem communication interface 606, the WAN interface 610, the LAN interface 612). In the case of the cellular communications in the electronic device 600, the QoS monitor 602 can receive such network performance information via the cellular communications core 604. The QoS manager 608 may also have a communication channel to a QoS subscriber service to authorize charges/credits for QoS adjustments.

In one implementation, the QoS manager 608 maintains the context of all active applications and that context of all applications that are having active sessions of voice and/or data. When an application 614 is activated or is initiating a session, the application 614 can communicate the traffic type of the session(s) to the QoS manager 608. The QoS manager 608 may already have a predefined list of tolerances for each parameter that influences the network performance and the QoS of that traffic type. For example, an example RealTimeVoIPQoSFeedback structure with tolerance for each QoS parameter for real time VoIP type of traffic is provided below. An example Traffic Type enum below lists an example enumeration of some of the traffic types and a Traffic Type Request, and an Active App QoS Feedback structure below illustrates a pseudo code union, wherein the pseudo code structure for feedback or tolerance definitions would be selected based on the traffic type.

In one implementation, the QoS manager 608 calculates a need to adjust the QoS when the application 614 initiates a communication session, at the end of a communication session of the application 614, during an ongoing communication session of the application 614, etc. When an active application 614 starts a communication session, the application 614 communicates the traffic type to the QoS manager 608 for which the QoS manager 608 has detailed QoS parameter values per traffic type, as described above. The QoS manager 608 maintains context of the QoS assigned by the network for all active communication channels/sessions/bearers used across all active applications. If the QoS needs for the traffic type of the application 614 are higher than the combination of the actual network conditions as received from the QoS monitor 602 and QoS of the currently assigned bearers/session communication channels can support, then the QoS manager 608 initiates a trigger to upgrade the QoS (e.g., a QoS adjustment request). On the other hand, the QoS needs of the newly started data session of an application may be well within the limits of an already established bearer/communication session channel etc. or even though the QoS assigned is insufficient, the current network conditions as received from the QoS monitor 602 is calculated to be sufficient, and thus the QoS monitor 602 will determine that there is no need to request an upgrade to the QoS.

When a communication session of an application 614 ends, the QoS manager 608 again re-evaluates the currently assigned QoS for active data sessions and, if the currently assigned QoS is much higher than the needs of the currently running application communication session traffic type needs, then the QoS manager 608 may trigger the procedure to request the network to downgrade the QoS via the cellular core interface 606. As such, if the QoS manager 608 determines that, in spite of termination of an application's communication session, the QoS assigned to currently active data sessions of other applications is sufficient by the traffic types of those data sessions, then no further action need be taken by the QoS manager to upgrade or downgrade. For an active data session or an ongoing data session from an application, the QoS manager 608 is able to compare the tolerance parameters defined per traffic type for expected performance and the experienced QoS feedback from the application 614 and make a determination of whether that application 614 needs an upgrade in QoS.

In one implementation, the QoS manager 608 can access an inventory of all active applications and active data sessions from each application. As such, the QoS manager 608 is able to aggregate this experienced QoS feedback and calculate the QoS upgrade needed per bearer. During an active session, the QoS manager 608 can evaluate other input to calculate whether a QoS upgrade is needed or not, including without limitation information received from the QoS monitor 602, which in turn gets input from the communications interface, which can be cellular, LAN or WAN, etc. on the electronic device.

From the perspective of FIG. 6, which takes cellular communications as an example, the QoS monitor 602 receives input from the cellular communications core 604. An example pseudo code snippet structure, CellularCoreQoSFeedbackResponse defined below, lists the ACK/NACK statistics, QCI per communication bearer, BLER, Latency statistics etc. that can be communicated to the QoS monitor 602. The QoS manager 608 combines this input from QoS monitor 602 with the experienced QoS feedback for each active application 614 and compares the combined information to the target tolerance for each of the listed QoS parameters based on the call type. Combining these two inputs from the QoS monitor 602 and experienced QoS feedback with the assigned QoS supports instances where the assigned QoS is determined to be insufficient but the experienced QoS feedback and received network conditions from the QoS monitor 602 are deemed to be sufficient to satisfy the predetermined network performance conditions. If for any of the active sessions some of the QoS parameters fall short of the target tolerance, then a QoS upgrade quantity is calculated and then the network service provider 616 (e.g., the cellular network, in this case) is requested to upgrade the QoS identified by the QoS parameters. The QoS manager 608 would initiate this request, and the example pseudo code structure, CellularChangeQoSRequest, can be used to populate the request. Such a request would eventually translate into the previously identified NAS-level messages. If the application 614 does not implement the experienced QoS feedback interface, then the QoS manager 608 can make the QoS upgrade request decision based on the input from the QoS monitor 602, which monitors the communication interface, without the experienced QoS feedback. Thus, the QoS manager 608 by implementation can be triggered to evaluate the current QoS needs during application communication session inception, application communication session end, and during periodic experienced QoS feedbacks from the applications, as well as QoS-monitor-provided network condition feedbacks provided periodically to the QoS manager 608.

It should be understood that the electronic device 600 may perform all the QoS upgrade requests mentioned above after user account payment is verified for the electronic device 600 and/or the user through an authorization process with the user account server or another processing system. Accordingly, in some implementations, QoS needs for the electronic device 600 can calculate not just in context of the electronic device 600 but also in context of the needs of each active application on the electronic device exchanging data to and from the network.

Figure 7:
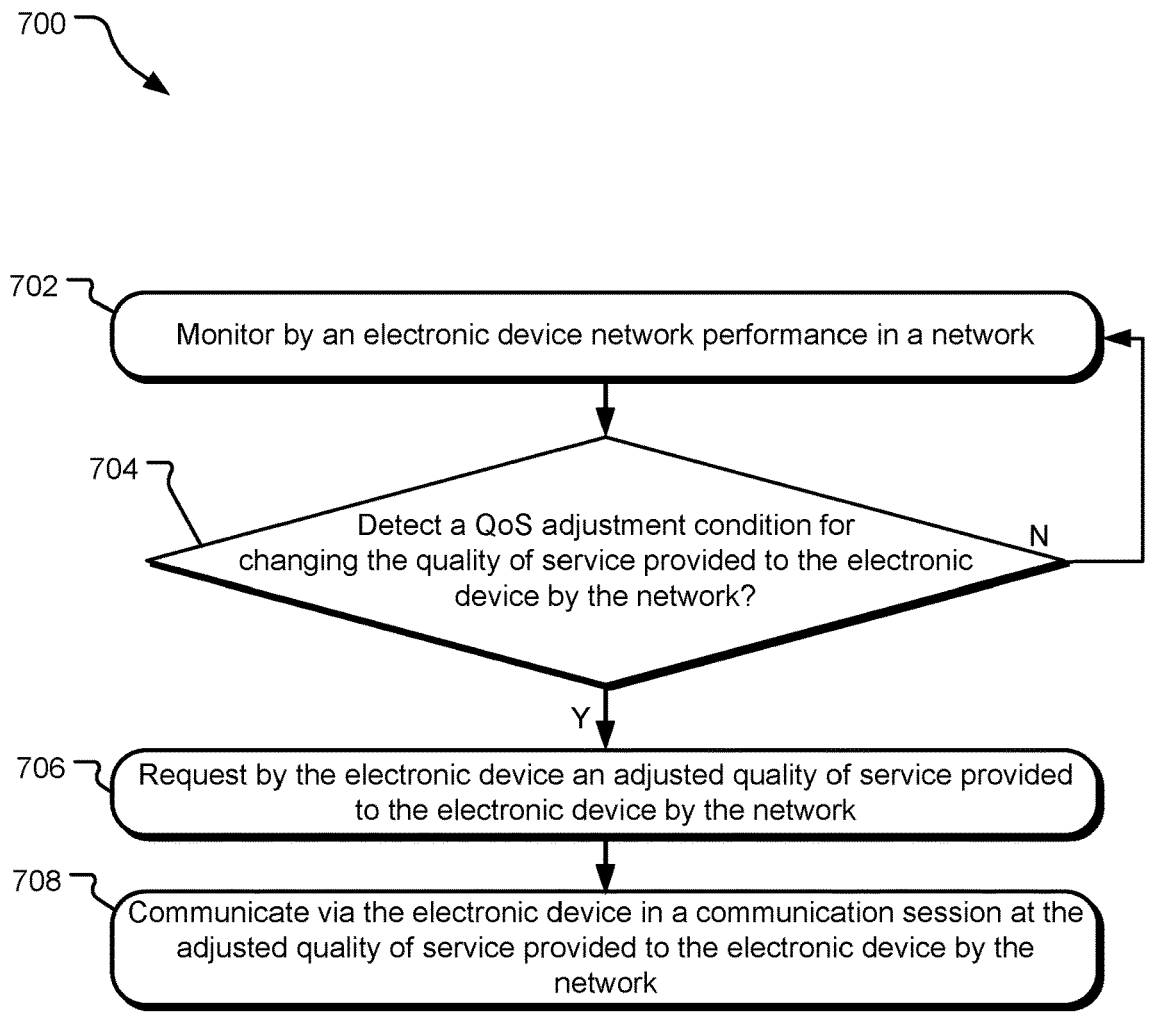
FIG. 7 illustrates example operations for responsively/dynamically managing quality of service of a communication session.

FIG. 7 illustrates example operations 700 for responsively/dynamically managing quality of service of a communication session. A monitoring operation 702 monitors an electronic device's performance during the communication session. In the implementation described with regard to FIG. 7, the electronic device performs the monitoring operation 702, although other devices, appliances, etc. may perform monitoring as well or in the alternative. For example, a videoconference application may be using a communication network for a videoconference call. The application identifies to a QoS manager the type of traffic it is handling and the desired QoS or a beneficial QoS for its traffic. In one implementation, for example, the electronic device monitors the network performance of its cellular communications service, although other communication services may be monitored as well.

A detecting operation 704 detects satisfaction of a QoS adjustment condition in which the QoS provided by the network is to be adjusted. For example, the application may specify a QoS higher than the QoS currently granted to the electronic device by the network. If satisfaction of such a QoS adjustment condition is not detected, the monitoring operation 702 continues to monitor the network performance. It should be understood that, although the application is calling for a higher QoS than is currently guaranteed by the network, the current network performance may be providing a sufficient bit rate, packet delay, etc. to satisfy the application. In such circumstances, the QoS adjustment condition is not satisfied because the current QoS is sufficient under current network conditions.

If satisfaction of the QoS adjustment condition is detected (and in some implementation, if the user/subscriber has the privilege or is otherwise authorized to request (and receive) a QoS adjustment), a requesting operation 706 transmits a QoS Change Request to the network (e.g., to the network service provider) to receive an adjusted QoS. In some implementations, the QoS manager can evaluate the user/subscriber's privilege or authorization for requesting a QoS adjustment before transmitting the request.

A communication operation 708 communicates via the electronic device in the communication session at the adjusted QoS. For example, the QoS may have been increased to provide better network performance for a particular application. In contrast, the QoS may be decreased because a videoconference call has been terminated and the enhanced QoS (and associated charges) are no longer beneficial.

Figure 8:
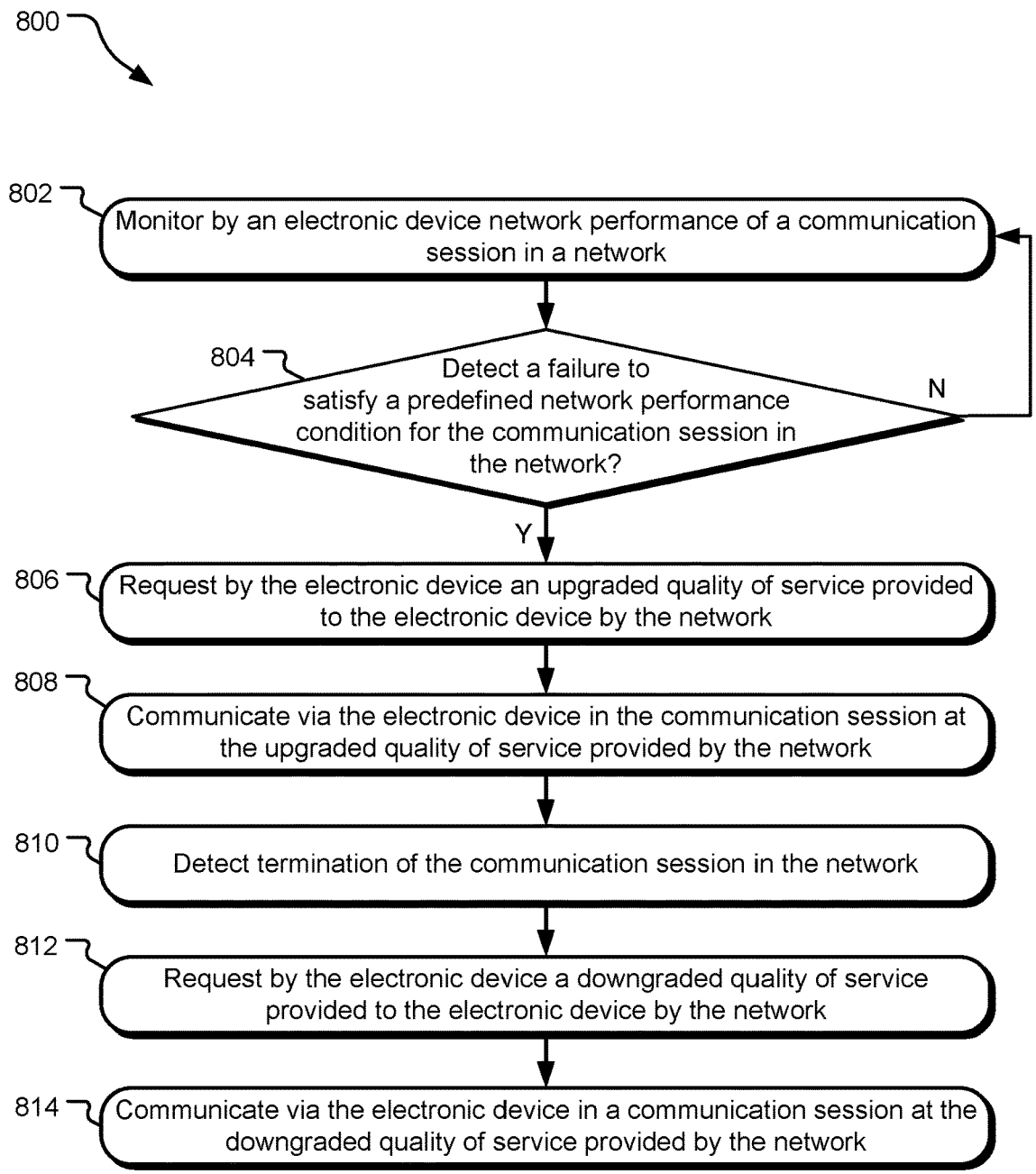
FIG. 8 illustrates alternative example operations for responsively/dynamically managing quality of service of a communication session.

FIG. 8 illustrates alternative example operations 800 for responsively/dynamically managing quality of service of a communication session. A monitoring operation 802 monitors an electronic device's performance during the communication session. In the implementation described with regard to FIG. 8, the electronic device performs the monitoring operation 802, although other devices, appliances, etc. may perform monitoring as well or in the alternative. For example, a videoconference application may be using a communication network for a videoconference call. The application identifies to a QoS manager the type of traffic it is handling and the desired QoS or a beneficial QoS for its traffic. In one implementation, for example, the electronic device monitors the network performance of its cellular communications service, although other communication services may be monitored as well.

A detecting operation 804 detects satisfaction of a QoS adjustment condition for changing the QoS provided to the electronic device by the network for a communication session (e.g., detecting a failure of the network to satisfy the predefined network performance condition of the communication session). For example, the network may not currently provide sufficient network performance to satisfy the QoS specified by an application for a particular type of traffic—the application may specify a QoS higher than the QoS currently granted to the electronic device by the network. If such a QoS adjustment condition is not satisfied (e.g., the predefined network performance condition for the application, traffic type, etc. is satisfied), the monitoring operation 802 continues to monitor the network performance. It should be understood that, although the application is calling for a higher QoS than is currently guaranteed by the network, the current network performance may be providing a sufficient bit rate, packet delay, etc. to satisfy the application's QoS needs. In such circumstances, the QoS adjustment condition is not satisfied because the current network performance is sufficient under current network conditions without adjusting the QoS provided by the network.

If the QoS adjustment condition is satisfied (and in some implementation, if the user/subscriber has the privilege or is otherwise authorized to request (and receive) a QoS adjustment), a requesting operation 806 transmits a QoS Change Request to the network (e.g., to the network service provider) to receive an upgraded QoS. In some implementations, the QoS manager can evaluate the user/subscriber's privilege or authorization for requesting a QoS upgrade before transmitting the request. A communication operation 808 communicates via the electronic device in the communication session at the upgraded QoS. For example, the QoS may have been increased to provided better network performance for a videoconference call.

Another detecting operation 810 detects a termination of the communication session in the network. As such, the electronic device determines that the upgraded QoS is no longer beneficial, and a requesting operation 812 requests a downgraded quality of service be provided to the electronic device by the network. A communication operation 814 communicates via the electronic device in the communication session at the downgraded QoS. For example, the QoS may be decreased because a videoconference call has been terminated and the enhanced QoS (and associated charges) are no longer beneficial. On the other hand, if there are active communication sessions that still need this enhanced QoS and/or the current network conditions are determined to decrease the QoS below the desired performance, then no action need be taken to downgrade the QoS, despite the end of that particular communication session.

In many cases, the assignment of QoS is primarily or totally controlled by the network service provider. The network service provider may or may not assign the requested QoS based on availability of resources or because resources need to be assigned to a higher priority customer, among other reasons. In other words, a request for a QoS adjustment may be denied by the network. In this case of denial of resources requested by the electronic device by the network, the electronic device will wait for a predefined backoff or a backoff value (e.g., as implemented by a backup timer) that is dynamically computed based on the reasons of rejection provided by the network, based on changes in link conditions due to a handover, etc. Once the backoff timer expires, the upgrade in QoS can be requested again in an iterative fashion, if still appropriate based on a re-evaluation of the current context at each iteration (e.g., a point in time). In the event of resource constraints, if the network rejects the electronic device's request to upgrade, reevaluating may also be performed based on the cause of the rejection and try to reinitiate other QoS adjustment requests iteratively in the order of their priority from the highest to the current level of QoS to see if whether a QoS upgrade to slightly better-than-current QoS may be achieved, even if the achieved QoS is not optimal. In some implementations, the iterative requests for a QoS adjustments may be for upgrades or downgrades of QoS for one or more communication sessions. In some implementations, the backoff and re-requesting will continue until the originally requested and/or optimal QoS is granted.

Example data structure, type, and interface specifications for responsively managing QoS are listed below, although other data structure, type, and interface specifications may be employed.

Below is an example enum definition of the types of data traffic. This enum definition is not intended to be an exhaustive list of the type of traffic and is merely intended to serve as an example type.

```
Traffic Type Enum{
    REAL_TIME_VOICE,
    REAL_TIME_VIDEO,
    REAL_TIME_GAMING,
    SLOWBACKGROUND,
    FASTBACKGROUND_HIGHTHROUGHPUT,
    EMERGENCY_CRITICAL,
    REAL_TIME_CRITICAL
}
```

A "Traffic" indicator specifies a type of network traffic handled by the application. The application specifies the Traffic type to the QoS manager via a TrafficType data structure defined below. The QoS manager uses this information to determine the QoS parameters and their tolerance values, which would be eventually compared to ExperiencedQoSFeedback and the network conditions input from the QoS monitor to determine whether there is a need to request a QoS adjustment.

```
TrafficType Request and Active App QoS Feedback Structure
{
    TrafficType tp,
    Union {
        Real Time Voice Parameters Structure,
        Real Time Video Parameters Structures,
        Real Time Gaming Structure,
        Slow Background Traffic Parameter Structure,
        Fast Background High Throughput Parameter Structure,
        Emergency Critical Parameters Structure,
        Real Critical Parameters Structure
    }
}
```

An example Traffic Type structures for Real Time Voice Over IP traffic and network performance feedback parameters are listed below:

```
//Parameters based on IETC RFC 3611
Struct RealTimeVoIPParams
{
    Lossrate_tolerance,
    Discardrate_tolerance,
    Burstduration_tolerance,
    GapDuration_tolerance,
    R_factor_tolerance,
    Mean_jitter_tolerance,
    Std_Dev_Jitter_Tolerance,
    MOS(MOS-LQ, MOS-CQ) // MOS Listening Quality/Conversational Quality
}
```

The tolerance parameters listed above would typically be predefined in the QoS manager per traffic type, although such parameters may be updated in same fashion.

```
Struct RealTimeVoIPQoSFeedback
{
  Current Time Averaged Packet Loss rate,
      Current Time Averaged Packet Discard rate,
      Current Time Averaged Packet Burst_duration,
      Current Time Averaged Packet Gap_Duration,
      Current Time Averaged Packet R_factor,
      Current Time Averaged Packet Mean jitter,
      Current Time Averaged Packet Std_Dev_Jitter,
      Current MOS(MOS-LQ, MOS-CQ) // MOS Listening Quality, MOS
  Conversational Quality
}
```

The feedback structure defined above is populated by each application and sent to the QoS manager. The parameters in the structure are typically compared to the predefined tolerance parameters. This feedback structure would be typically used in combination with the network conditions feedback to determine whether a QoS change is needed.

A data structure for requesting a cellular communications core to change the QoS is provided below:

```
Struct CellularChangeQoSRequest
{
    QCI,
    Priority
    PacketDelayTolerance
    PacketLossTolerance
}
```

A QoS monitor can receive periodic reporting of the network conditions experienced by a cellular communications core to help the QoS manager to make informed decisions about the benefit of dynamically requesting a changing QoS for a given communication session on a network. This feedback on the network conditions in combination with aggregated Experienced QoS Feedback for each Application is compared to the predefined QoS tolerance to determine whether QoS change is needed and also to calculate the level of QoS needed for the communication session.

```
Struct CellularCoreQoSFeedbackResponse
{
    NetworkAssignedQosPerBearer[ ],
    BLER,
    NACK/NoAck Quantization
    RSSI,
    RSCP,
    Latency Per Bearer[ ]
}
```

Figure 9:
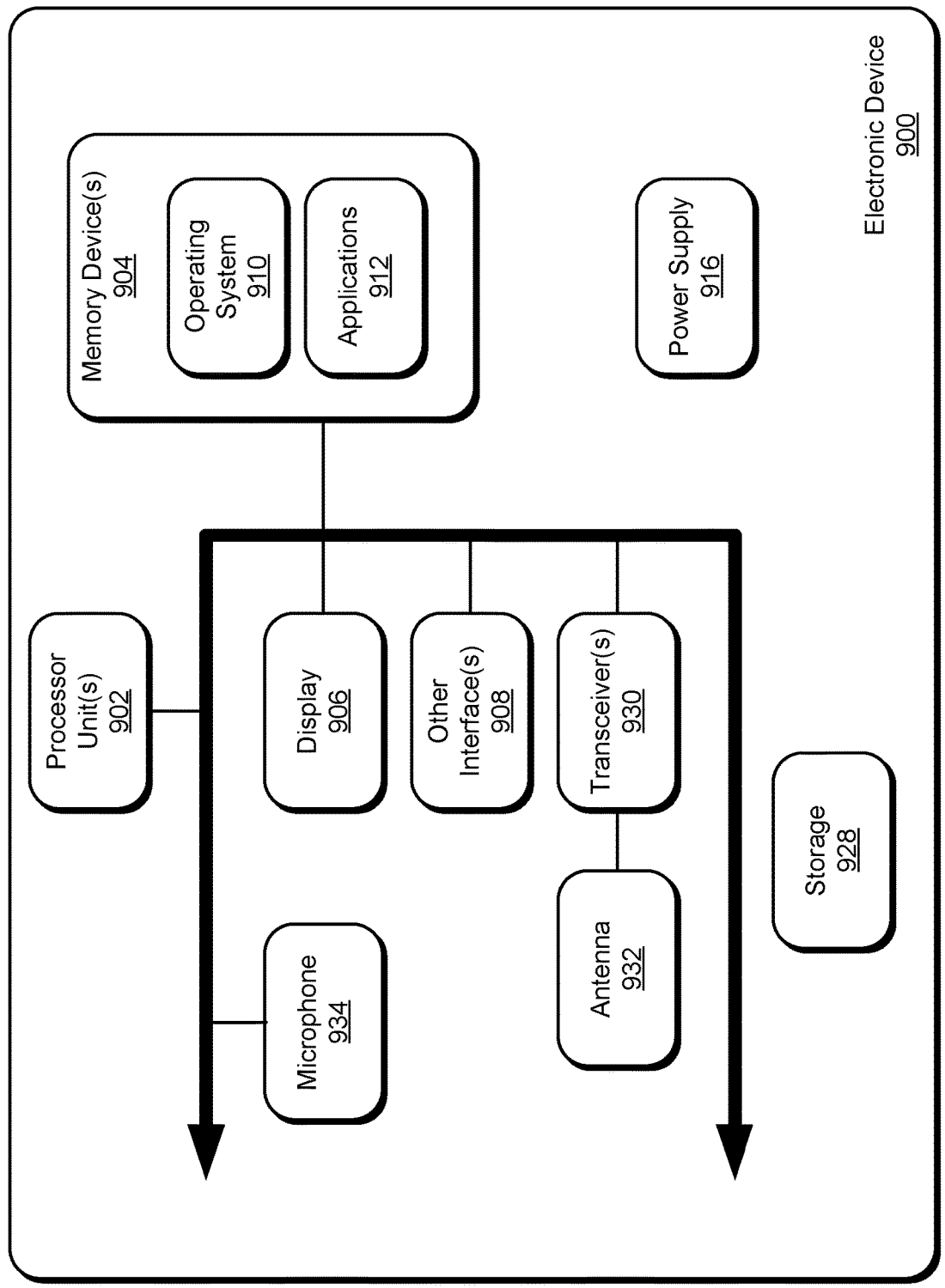
FIG. 9 illustrates an example schematic of an electronic device suitable for implementing aspects of responsive/dynamic quality of service management.

FIG. 9 illustrates an example schematic of an electronic device suitable for implementing aspects of responsive/dynamic quality of service management. The example electronic device 900 includes one or more processor units 902, one or more memory devices 904, a display 906 (e.g., a touchscreen display or lights, a hardcopy output device such as a printer), and other interfaces 908 (e.g., buttons). The memory 904 generally includes both volatile memory (e.g., RAM) and non-volatile memory (e.g., flash memory). An operating system 910, such as the Microsoft Windows® operating system, the Microsoft Windows® Mobile operating system or a specific operating system designed for a gaming device or any other device (e.g., such as IoT devices), resides in the memory 904 and is executed by the processor unit(s) 902, although it should be understood that other operating systems and device forms may be employed.

One or more applications 912, such as a videoconferencing application, a VOIP application, a browser, and online gaming application, are loaded in the memory device 904 and executed on the operating system 910 by the processor(s) 902. The example electronic device 900 includes a power supply 916, which is powered by one or more batteries or other power sources and which provides power to other components of the electronic device 900. The power supply 916 may also be connected to an external power source that overrides or recharges the built-in batteries or other power sources.

The electronic device 900 includes one or more communication transceivers 930 and an antenna 932 to provide network connectivity (e.g., a mobile phone network, Wi-Fi®, Bluetooth®, etc.). The electronic device 900 may also include various other components, such as a positioning system (e.g., a global positioning satellite transceiver), one or more accelerometers, one or more cameras, an audio interface (e.g., a microphone 934, an audio amplifier and speaker and/or audio jack), and additional storage 928. Other configurations may also be employed.

In an example implementation, an operating system, various applications (including a videoconferencing application), a QoS manager, a QoS monitor, and other modules and services may be embodied by instructions stored in memory 904 and/or storage devices 928 and processed by the processing unit(s) 902. Network performance parameters, QoS settings, QoS change requests and other information may be stored in the memory 904 and/or storage devices 908 as persistent datastores.

The electronic device 900 may include a variety of tangible processor-readable storage media and intangible processor-readable communication signals. Tangible processor-readable storage can be embodied by any available media that can be accessed by the electronic device 900 and includes both volatile and nonvolatile storage media, removable and non-removable storage media. Tangible processor-readable storage media excludes intangible and transitory communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the electronic device 900. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more processor-based systems. The logical operations may be implemented (1) as a sequence of processor-implemented steps executing in one or more processor-based systems and (2) as interconnected machine or circuit modules within one or more processor-based systems. The implementation is a matter of choice, dependent on the performance requirements of the processor-based system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

An example method of managing a quality of service provided to an electronic device during a communication session in a network includes detecting by the electronic device satisfaction of a quality of service adjustment condition for changing the quality of service provided to the electronic device by the network. The electronic device requests an adjusted quality of service provided to the electronic device by the network, responsive to the detecting operation. The electronic device communicates in the communication session at the adjusted quality of service provided to the electronic device by the network, responsive to the requesting operation.

Another example method of any preceding method further includes monitoring by the electronic device network performance in the network. The monitoring operation provides information for evaluating the quality of service adjustment condition for changing the quality of service.

Another example method of any preceding method further includes monitoring by the electronic device operation of the electronic device. The monitoring operation provides information for evaluating the quality of service adjustment condition for changing the quality of service.

Another example method of any preceding method, wherein the electronic device is a first electronic device, further includes monitoring by the first electronic device network performance of the communication session in the network. The communication session occurs between the first electronic device and at least one other electronic device communicatively coupled to the network.

Another example method of any preceding method wherein the electronic device is a first electronic device and the detecting operation includes detecting by the first electronic device that the network performance of the communication session in the network fails to satisfy a predefined network performance condition for the communication session.

Another example method of any preceding method wherein the requesting operation includes requesting by the first electronic device an upgraded quality of service provided by the network, responsive to the operation of detecting by the first electronic device.

Another example method of any preceding method wherein the operation of requesting by the first electronic device includes communicating via the first electronic device in the communication session at the upgraded quality of service provided by the network. The upgraded quality of service satisfies the predefined network performance condition for the communication session.

Another example method of any preceding method further includes detecting termination of the communication session in the network. The first electronic device requests a downgraded quality of service provided to the electronic device by the network. The first electronic device then communicates in a communication session at the downgraded quality of service provided by the network.

Another example method of any preceding method further includes receiving a denial from the network of a request for an adjusted quality of service. The electronic device detects satisfaction of a quality of service adjustment condition for changing the quality of service provided to the electronic device by the network, after expiration of a backoff period. The electronic device re-requests an adjusted quality of service provided to the electronic device by the network, responsive to the operation of detecting after the backoff period.

Another example method of any preceding method further includes receiving a denial from the network of the request for an adjusted quality of service. The electronic device detects satisfaction of a quality of service adjustment condition for changing the quality of service provided to the electronic device by the network, after expiration of a backoff period. The electronic device iteratively requests different adjusted qualities of service provided to the electronic device by the network, after expiration of the backoff period.

Another example method of any preceding method further includes receiving at the electronic device cost information associated with the adjusted quality of service in the communication session. The electronic device presents the cost information associated with the adjusted quality of service and responds to a prompt by authorizing a request for the adjusted quality of service, responsive to presentation of the cost information.

An example system for managing a quality of service provided to an electronic device during a communication session in a network includes a quality of service monitor of the electronic device configured to detect satisfaction of a quality of service adjustment condition for changing the quality of service provided to the electronic device by the network. A quality of service manager of the electronic device is configured to request an adjusted quality of service provided to the electronic device by the network. A communication interface of the electronic device is configured to communicate in the communication session at the adjusted quality of service provided to the electronic device by the network.

One or more tangible processor-readable storage media are embodied with instructions for executing on one or more processors and circuits of a device an example process managing a quality of service provided to an electronic device during a communication session in a network The example process includes detecting by the electronic device satisfaction of a quality of service adjustment condition for changing the quality of service provided to the electronic device by the network, requesting by the electronic device an adjusted quality of service provided to the electronic device by the network, responsive to the detecting operation, and communicating via the electronic device in the communication session at the adjusted quality of service provided to the electronic device by the network, responsive to the requesting operation.

One or more other tangible processor-readable storage media of any preceding media provides an example process that further includes monitoring by a first electronic device network performance of the communication session in the network. The communication session occurs between the first electronic device and at least one other electronic device communicatively coupled to the network.

One or more other tangible processor-readable storage media of any preceding media provides an example process wherein the electronic device is a first electronic device and the detecting operation includes detecting by the first electronic device that the network performance of the communication session in the network fails to satisfy a predefined network performance condition for the communication session.

One or more other tangible processor-readable storage media of any preceding media provides an example process wherein the requesting operation includes requesting by the first electronic device an upgraded quality of service provided by the network, responsive to the operation of detecting by the first electronic device.

One or more other tangible processor-readable storage media of any preceding media provides an example process wherein the requesting operation includes communicating via the first electronic device in the communication session at the upgraded quality of service provided by the network. The upgraded quality of service satisfies the predefined network performance condition.

One or more other tangible processor-readable storage media of any preceding media provides an example process that further includes detecting termination of the communication session in the network.

One or more other tangible processor-readable storage media of any preceding media provides an example process that further includes requesting by the electronic device a downgraded quality of service provided to the electronic device by the network.

One or more other tangible processor-readable storage media of any preceding media provides an example process that further includes communicating via the electronic device in a communication session at the downgraded quality of service provided by the network.

An example system method of managing a quality of service provided to an electronic device during a communication session in a network includes means for detecting by the electronic device satisfaction of a quality of service adjustment condition for changing the quality of service provided to the electronic device by the network, Means for requesting an adjusted quality of service provided to the electronic device by the network, responsive to the detecting operation, and means for communications in the communication session at the adjusted quality of service provided to the electronic device by the network, responsive to the requesting operation.

Another example system of any preceding system further includes means for monitoring by the electronic device network performance in the network. The monitoring means provides information for evaluating the quality of service adjustment condition for changing the quality of service.

Another example system of any preceding system further includes means for monitoring by the electronic device operation of the electronic device. The monitoring means provides information for evaluating the quality of service adjustment condition for changing the quality of service.

Another example system of any preceding system, wherein the electronic device is a first electronic device, further includes means for monitoring by the first electronic device network performance of the communication session in the network. The communication session occurs between the first electronic device and at least one other electronic device communicatively coupled to the network.

Another example system of any preceding system further includes wherein the electronic device is a first electronic device and the means for detecting detects by the first electronic device that the network performance of the communication session in the network fails to satisfy a predefined network performance condition for the communication session.

Another example system of any preceding system further includes wherein the means for requesting by the first electronic device an upgraded quality of service provided by the network, responsive to the operation of detecting by the first electronic device.

Another example system of any preceding system further includes wherein the means for requesting includes means for communicating via the first electronic device in the communication session at the upgraded quality of service provided by the network. The upgraded quality of service satisfies the predefined network performance condition for the communication session.

Another example system of any preceding system further includes means for detecting termination of the communication session in the network. The first electronic device requests a downgraded quality of service provided to the electronic device by the network. The first electronic device then communicates in a communication session at the downgraded quality of service provided by the network.

Another example system of any preceding system further includes means for receiving a denial from the network of a request for an adjusted quality of service. The electronic device detects satisfaction of a quality of service adjustment condition for changing the quality of service provided to the electronic device by the network, after expiration of a backoff period. The electronic device re-requests an adjusted quality of service provided to the electronic device by the network, responsive to the operation of detecting expiration of the backoff period.

Another example system of any preceding system further includes means for receiving a denial from the network of a request for an adjusted quality of service. The electronic device detects satisfaction of a quality of service adjustment condition for changing the quality of service provided to the electronic device by the network, expiration of the backoff period. The electronic device iteratively requests different adjusted qualities of service provided to the electronic device by the network, responsive to the operation of detecting expiration of the backoff period.

Another example system of any preceding system further includes receiving at the electronic device cost information associated with the adjusted quality of service in the communication session. The electronic device presents the cost information associated with the adjusted quality of service and responds to a prompt by authorizing a request for the adjusted quality of service, responsive to presentation of the cost information.

The above specification, examples, along with the following claims, provide a complete description of the structure and use of exemplary implementations of the technology.

What is claimed is:

1. A method of managing a quality of service provided to an electronic device during a communication session in a network, the method comprising:
    detecting, by the electronic device, satisfaction of a quality of service adjustment condition for changing the quality of service provided to the electronic device by the network;
    receiving, at the electronic device, cost information associated with an adjusted quality of service in the communication session, responsive to the detecting operation;
    authorizing, via the electronic device, the adjusted quality of service, responsive to receipt of the cost information;
    requesting, by the electronic device, the adjusted quality of service provided to the electronic device by the network, responsive to the authorizing; and
    communicating, via the electronic device, in the communication session at the adjusted quality of service provided to the electronic device by the network, responsive to the requesting operation.

2. The method of claim 1 further comprising:
    monitoring, by the electronic device, network performance in the network, the monitoring operation providing information for evaluating the quality of service adjustment condition for changing the quality of service.

3. The method of claim 1 further comprising:
    monitoring, by the electronic device operation, of the electronic device, the monitoring operation providing information for evaluating the quality of service adjustment condition for changing the quality of service.

4. The method of claim 1 wherein the electronic device is an electronic device and further comprising:
    monitoring, by the electronic device, network performance of the communication session in the network, the communication session being between the electronic device and at least one other electronic device communicatively coupled to the network.

5. The method of claim 1 wherein the electronic device is an electronic device and the detecting operation comprises:
    detecting, by the electronic device, that network performance of the communication session in the network fails to satisfy a predefined network performance condition for the communication session.

6. The method of claim 5 wherein the requesting operation comprises:
    requesting, by the electronic device, an upgraded quality of service provided by the network, responsive to the operation of detecting by the electronic device.

7. The method of claim 6 wherein the operation of requesting by the electronic device comprises:
    communicating, via the electronic device, in the communication session at the upgraded quality of service provided by the network, the upgraded quality of service satisfying the predefined network performance condition for the communication session.

8. The method of claim 7 further comprising:
    detecting termination of the communication session in the network;
    requesting, by the electronic device, a downgraded quality of service provided to the electronic device by the network; and
    communicating, via the electronic device, in a communication session at the downgraded quality of service provided by the network.

9. The method of claim 1 further comprising:
    receiving a denial from the network of a request for an adjusted quality of service;
    detecting, by the electronic device, satisfaction of a quality of service adjustment condition for changing the quality of service provided to the electronic device by the network, after expiration of a backoff period; and
    re-requesting, by the electronic device, an adjusted quality of service provided to the electronic device by the network, responsive to the operation of detecting after expiration of the backoff period.

10. The method of claim 1 further comprising:
    receiving a denial from the network of a request for an adjusted quality of service;
    detecting, by the electronic device, satisfaction of a quality of service adjustment condition for changing the quality of service provided to the electronic device by the network, after expiration of a backoff period; and
    iteratively requesting, by the electronic device, different adjusted qualities of service provided to the electronic device by the network, responsive to the operation of detecting after expiration of the backoff period.

11. A system for managing a quality of service provided to an electronic device during a communication session in a network, the system comprising:
    a quality of service monitor of the electronic device configured to detect satisfaction of a quality of service adjustment condition for changing the quality of service provided to the electronic device by the network;
    a quality of service manager of the electronic device configured to:
        receive at the electronic device, cost information associated with an adjusted quality of service in the communication session, responsive to the detection of satisfaction of the quality of service condition,
        authorize, via the electronic device, the adjusted quality of service, responsive to receipt of the cost information,
        request an adjusted quality of service provided to the electronic device by the network, responsive to authorization; and
    a communication interface of the electronic device configured to communicate in the communication session at the adjusted quality of service provided to the electronic device by the network.

12. The system of claim 11 wherein adjusted quality of service is an upgraded quality of service or a downgraded quality of service.

13. One or more tangible processor-readable storage media embodied with instructions for executing on one or more processors and circuits of a device a process managing a quality of service provided to an electronic device during a communication session in a network, the process comprising:
    detecting, by the electronic device, satisfaction of a quality of service adjustment condition for changing the quality of service provided to the electronic device by the network;
    receiving, at the electronic device, cost information associated with an adjusted quality of service in the communication session, responsive to the detecting operation;
    authorizing, via the electronic device, the adjusted quality of service, responsive to receipt of the cost information;

requesting, by the electronic device, the adjusted quality of service provided to the electronic device by the network, responsive to the authorizing; and communicating, via the electronic device, in the communication session at the adjusted quality of service provided to the electronic device by the network, responsive to the requesting operation.

14. The one or more tangible processor-readable storage media of claim 13, wherein the process further comprises:
monitoring, by an electronic device, network performance of the communication session in the network, the communication session being between the electronic device and at least one other electronic device communicatively coupled to the network.

15. The one or more tangible processor-readable storage media of claim 13 wherein the electronic device is an electronic device and the detecting operation comprises:
detecting, by the electronic device, that network performance of the communication session in the network fails to satisfy a predefined network performance condition for the communication session.

16. The one or more tangible processor-readable storage media of claim 15 wherein the requesting operation comprises:

requesting, by the electronic device, an upgraded quality of service provided by the network, responsive to the operation of detecting by the electronic device.

17. The one or more tangible processor-readable storage media of claim 16 wherein the requesting operation further comprises:
communicating, via the electronic device, in the communication session at the upgraded quality of service provided by the network, the upgraded quality of service satisfying the predefined network performance condition.

18. The one or more tangible processor-readable storage media of claim 17, wherein the process further comprises:
detecting termination of the communication session in the network.

19. The one or more tangible processor-readable storage media of claim 18 wherein the process further comprises:
requesting, by the electronic device, a downgraded quality of service provided to the electronic device by the network.

20. The one or more tangible processor-readable storage media of claim 19 wherein the process further comprises:
communicating, via the electronic device, in a communication session at the downgraded quality of service provided by the network.

* * * * *